(12) United States Patent
Lan et al.

(10) Patent No.: US 10,904,708 B1
(45) Date of Patent: Jan. 26, 2021

(54) SYSTEMS AND METHODS OF PROVIDING A LOCATION

(71) Applicant: T-Mobile USA, Inc., Bellevue, WA (US)

(72) Inventors: Wei-Ming Lan, Morrisville, NC (US); Nan Xiao, Mercer Island, WA (US)

(73) Assignee: T-MOBILE USA, INC., Belleveu, WA (US)

( * ) Notice: Subject to any disclaimer, the term of this patent is extended or adjusted under 35 U.S.C. 154(b) by 0 days.

(21) Appl. No.: 16/586,655

(22) Filed: Sep. 27, 2019

(51) Int. Cl.
*H04W 4/02* (2018.01)
*H04W 4/029* (2018.01)
*H04W 4/90* (2018.01)

(52) U.S. Cl.
CPC .......... *H04W 4/029* (2018.02); *H04W 4/023* (2013.01); *H04W 4/90* (2018.02)

(58) Field of Classification Search
CPC ........ H04W 4/029; H04W 4/023; H04W 4/90
See application file for complete search history.

(56) References Cited

U.S. PATENT DOCUMENTS

| 9,674,659 | B2* | 6/2017 | Zebregs | G01S 5/02 |
| 2009/0061898 | A1* | 3/2009 | Johnson | H04W 64/00 455/456.2 |
| 2011/0159886 | A1* | 6/2011 | Kangas | H04W 64/00 455/456.1 |

\* cited by examiner

*Primary Examiner* — Joseph E Dean, Jr.
(74) *Attorney, Agent, or Firm* — Lane Powell PC

(57) ABSTRACT

Systems and methods of providing a location that include receiving location data from user equipment, such as a cellphone or mobile device, and providing the location data in an acceptable form to emergency services, such as a Public Safety Answering Point (PSAP). The location data from the user equipment can undergo a shape conversion process prior to being transmitted to emergency services. The systems and methods evaluate the received location data to determine if a semimajor and a semiminor axis of the received location data are equal in magnitude. If so, the shape conversion process is bypassed to prevent error from being introduced into the location data.

16 Claims, 4 Drawing Sheets

SYSTEMS AND METHODS OF PROVIDING A LOCATION

BACKGROUND

In the past, emergency services were typically contacted using a telephone that was connected to a landline. The physical nature of the connection of the landline made the process of linking an incoming call to a physical location an easy task. Now, the rise of mobile devices that are not physically connected to a communication line, like cellular telephones, means that people may contact or call emergency services from any geographic location with cellular service.

Determining a location of a mobile device, or user equipment (UE), that is contacting emergency services, such as a Public Service Answering Point (PSAP), can be difficult due to the device not having an associated permanent, physical location. The location determination often produces a result showing that the mobile device is located in a general geographical area rather than a specific geographical location. Various methods and systems are used by the UE, a cellular carrier or provider, or both to determine the location of the UE contacting emergency services. For example, the UE may determine and provide a location of itself or the carrier may triangulate a location of the UE based on signals emitted by the UE. The conventional methods do not determine an exact location of the UE and often result in an indicated location of the UE with some uncertainty. The uncertainty about the indicated location of the UE can result in a somewhat large geographical area in which the UE may be physically located. The uncertainty associated with the indicated location can also cause difficulty for emergency services attempting to locate the user associated with the UE, which can cause reduced efficiency or effectiveness of the emergency response.

What is needed is a system(s) and method(s) that reduces the uncertainty associated with location information provided by UE, such as a mobile device to assist with increasing the efficiency, effectiveness, or both, of a response by emergency services.

DETAILED DESCRIPTION

Figure 1:
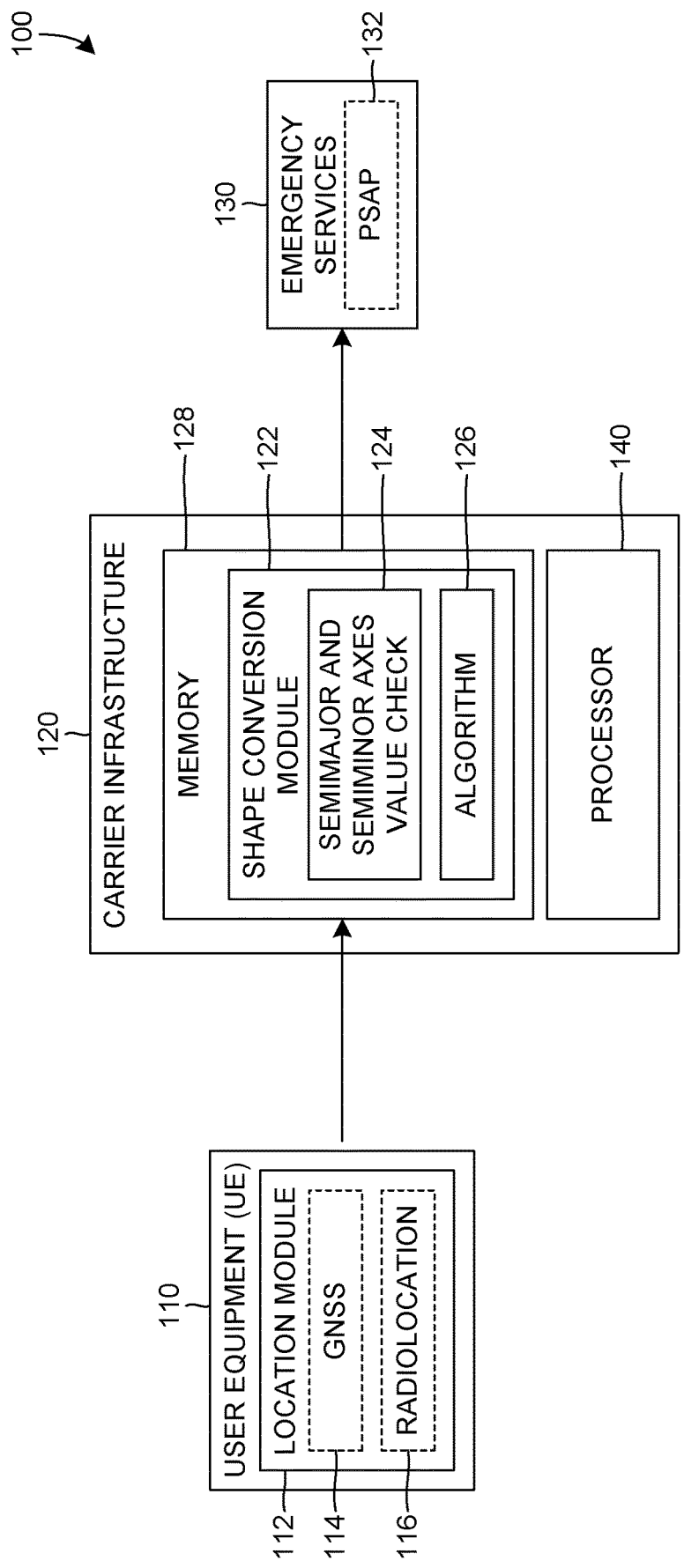
FIG. 1 is an example system of providing a location of a UE.

The described systems and methods of providing a location improve an uncertainty associated with user equipment (UE) locations provided to emergency service. More specifically, the described location providing systems and methods minimize or eliminate introduced uncertainty caused by converting UE-provided location to a format required or preferred by emergency services. For instance, the Public Safety Answering Point (PSAP) can require or prefer that the UE location be provided in a particular format, which can be different than the format in which the UE provides a location. When contacting emergency services, the UE can be caused to provide a location that includes location data regarding the current geographical location of the UE to the emergency services. The UE can provide its geographical location as location data that includes a set of coordinates with an associated amount of uncertainty based on the accuracy of how the UE has determined its location, such as by using satellite navigation or other on-device systems or methods. The various on-device systems and methods of determining the location of the UE, such as a set of coordinates, have an amount of inherent inaccuracy with some systems or methods having an increased accuracy of determining a location of the UE over other systems or methods. The uncertainty of the coordinates provided by the UE is represented as a semimajor axis and a semiminor axis.

The semimajor and semiminor axes define an area of uncertainty about an origin that is the set of coordinates provided by the UE. As such, the actual geographical location of the UE might not actually be at the coordinates provided by the UE. Instead, the actual geographical location of the UE may fall within this area of uncertainty. The area of uncertainty is provided as a semimajor axis and a semiminor axis, which define an area of uncertainty that is shaped as an ellipse or an "uncertainty ellipse." Emergency services, such as a PSAP, require that a location from a UE is provided as a location data that includes set of coordinates and a radius or axis that indicates the uncertainty associated with the provided coordinates. To provide emergency services with the location data from the UE, cellular service providers have infrastructure that performs a shape conversion process on the location data received from the UE to convert the shape of the area of uncertainty of the received location data or location, such as a set of coordinates and an elliptically-shaped area of uncertainty, into converted location data or location, such as a set of coordinates and a circular-shaped area of uncertainty, that can be provided to the PSAP.

In an example, the received location data from the UE can include a semimajor axis having a first feature, such as a first value or magnitude, and semiminor axis having a similar feature, such as a second value or magnitude, that is less than the first value. That is, the uncertainty associated with the coordinates provided by the UE is an area of uncertainty that has a shape defined by the semimajor and semiminor axes, such as ellipse shaped area of uncertainty. A shape conversion process uses an algorithm to convert the UE provided location data, in this example containing an elliptically-shaped area of uncertainty, into converted location data that includes a circular-shaped area of uncertainty that is defined by a set of coordinates and a radius. The shape-converted location data or location, such as a set of geographical coordinates and associated area of uncertainty, can be provided to the PSAP. In another example, a feature, such as the values of semimajor and semiminor axes of the location data received from the UE, can be equal. That is, the UE-provided location data includes a circular-shaped area of uncertainty. Prior to providing this location data to the emergency services, the network infrastructure automatically performs the shape conversion process on the location data received from the UE. However, because the shape conversion algorithm is attempting to convert an already circular-shaped area of uncertainty into a circular-shaped area of uncertainty that can be provided to the emergency services, the resultant converted location data can have additional uncertainty introduced by the shape conversion process.

To avoid introducing unnecessary uncertainty caused by performing shape conversions on UE-provided location data that already defines a circular-shaped area of uncertainty, the disclosed systems and methods first compare a feature of the semimajor and semiminor axes, such as their values or magnitudes, of the UE-provided location data to determine if the semimajor and semiminor axes are equal. If the semimajor and semiminor axes of the UE's provided location data are equal, then the systems and methods can bypass the shape conversion process entirely, which prevents the introduction of additional uncertainty. The UE-provided location data can be processed to format the location data into a format or structure that is required by the PSAP, if necessary.

FIG. 1 is an example system 100 of providing a location that includes UE 110, carrier infrastructure 120 and emergency services 130. In an emergency situation, such as during a phone call to emergency services, the UE 110 can provide a location or location data to the carrier infrastructure 120, which can then provide a location or data indicative of a location of the UE 110 to the emergency services 130. The emergency services 130 can require, or desire, the provided location be in a particular format, include particular information or characteristics, or both. For example, the emergency services 130 can require that the provided location be in a format that includes a set of coordinates and a single radius that denotes the uncertainty associated with the provided location. The carrier infrastructure 120 can process the location data provided by the UE 110 to prepare the location data in the proper format for the emergency services 130.

The UE 110 includes a location module 112 that determines a location of the UE 110. The location module can include various sensors and systems that can be used to determine a location of the UE 110, such as by using external radio, or other, signals received by the UE 110. In an example, the location module 112 can include a Global Navigation Satellite System (GNSS) system 114, one or more radiolocation systems 116, other various location determining and sensing elements, systems or features, or combinations thereof. The GNSS system 114 can include Global Positioning System (GPS), GLONASS, Galileo, Beidou, other satellite navigation systems, or combinations thereof. To assist with determining the position of the UE 110, the GNSS system 114 receives signals from one or more satellites, and these signals are processed to determine the location of the UE 110. The radiolocation system 116 can include one or more elements that receive various radio signals, such as cellular telephone signals, signals emitted by Wi-Fi access points, signals emitted from beacons, or other radio signals. The received radio signals can be processed and analyzed to determine a location of the UE 110.

The location module 112 can use a combination of the various location sensors and systems, including GNSS 114, radiolocation 116, or other sensors or systems of the UE 110 to determine and provide a location of the UE 110. Other sensors or systems of the device can include an accelerometer, gyroscope, or other sensors and systems of the UE 110. The location module 110 can use the data from the various other sensors and systems to generate, or provide, a Device-Based Hybrid (DBH) location. The DBH location can be more accurate than a location determined using a particular sensor or system of the UE 110 because the DBH location can account for the environment in which the UE 110 is located. For example, when UE 110 is in an urban or high-population environment, it may experience difficulties determining an accurate location of the UE using a GNSS system 114, such as GPS, due to the difficulties in receiving satellite signals within such an environment, such as caused by obstructions and other environmental factors. As such, the location of the UE 110 within the urban environment, determined using a GNSS system 114, can have more uncertainty or error than a location determined using GNSS 114 in a more open environment. The UE 110 can account for the environment by determining a DBH location using other sensor or systems of the UE 110, such as Wi-Fi signals or Bluetooth® beacon signals. The location data from the various sensors and systems can be processed and combined by the UE 110 to generate a DBH location of the UE 110, which can have an increased accuracy, or lower error, than a location determined using a single sensor or system.

When the UE 110 contacts emergency services 130, such as a PSAP 132, the UE 110 can provide or can be requested to provide location data to allow the emergency services 130 to determine or learn a current location of the UE 110. To provide the location data to the emergency services 130, the UE 110 can first provide the location data, such as a DBH location that includes a set of coordinates and uncertainty, to the carrier infrastructure 120. The carrier infrastructure 120 can process and provide the location data from the UE 110 to the emergency services 130. Additionally, the carrier infrastructure 120 can format, or structure, the location data before providing the location data to the emergency services 130. Since, as discussed previously, the emergency services 130 can require or desire that the provided location information is received in a particular format or structure.

The UE 110 can provide the location data as a set of coordinates, such as a latitude and longitude, and an associated uncertainty. The uncertainty is due to not being able to guarantee an exact location of the UE 110 when providing the location of the UE 110. There are many ways in which the uncertainty of the location can be provided. In the example of providing a DBH location, the uncertainty can be provided as a semimajor axis and a semiminor axis, which are centered on the provided longitude and latitude coordinates. As such, the DBH is often represented as an elliptically-shaped area of uncertainty about the set of coordinates provided by the UE 110. It is within this area of uncertainty in which the UE 110 is located, or determined to be located. However, many emergency services 130 require, or desire, that the provided location of the UE include a set of coordinates and a circular-shaped area of uncertainty, such as a radius or axis defining the area of uncertainty about the provided coordinates. The carrier infrastructure 120 can convert the location data provided by the UE 110 into the proper format or shape required, or desired, by the emergency services 130.

The carrier infrastructure, such as an Evolved Serving Mobile Location Center (ESMLC), can include a shape conversion module 122 and a processor 140, and can perform a shape conversion process that can convert the provided location data from the UE 110 into another format or structure for the emergency services 130. The shape conversion module 122 can receive the UE-provided location data, such as a DBH or other location, and can convert the UE-provided location information, such as a set of coordinates and an elliptically-shaped area of uncertainty, to a set of coordinates and a circular-shaped area of uncertainty that is provided to the emergency services 130. The shape conversion module 122 can include a memory 128 which stores location data instructions, including a semimajor and semiminor axes value check 124 and an algorithm 126 to convert location data. To perform the shape conversion, the shape conversion module 122 can include the algorithm 126 that uses one or more mathematical functions to convert the location data received from the UE 110 into the location data that is provide to the emergency services 130.

The algorithm 126 can convert the location provided by the UE 110 into a converted location that can be provided to the emergency services 130. However, if the location data provided by the UE includes a circular-shaped are of uncertainty, the shape conversion algorithm can introduce additional uncertainty into the location data, as the process tries to convert the already circular-shaped area of uncertainty provided by the UE into the circular-shaped area of uncertainty that is to be transmitted to the emergency services 130. That is, in situations in which the UE 110 provided location has semimajor and semiminor axes of equal magnitude or value, the shape conversion module 122 can attempt to convert the provided location and output a converted location having a radius, or axis, greater than either of the semimajor and semiminor axes. As such, the resultant circular-shaped area of uncertainty of the converted location is larger than the initial circular-shaped area of uncertainty of the location information provided by the UE 110. This greater uncertainty results in a larger area of uncertainty being provided to the emergency services 130, which can increase the difficulty in determining the actual, physical location of the UE 110. However, this increased uncertainty introduced by the shape conversion module 122, or shape conversion process, can be reduced or eliminated by not performing the shape conversion process on the UE 110 provided location when the semimajor and semiminor axes are equal.

To prevent the unnecessary introduced uncertainty by the shape conversion process, the shape conversion module 122 can include the semimajor and semiminor axes value check 124 that compares a feature, such as the magnitudes or values of the semimajor and semiminor axes, to determine if they have a pre-determined value, such as the magnitude of value of the semimajor and semiminor axes being equal. If the check 124 determines that the semimajor and semiminor axes are equal in magnitude or value, it can cause the UE-provided location to bypass the shape conversion process, such as shape conversion by the algorithm 126. If the check 124 determines the semimajor and semiminor axes are different magnitudes or values, it can allow the shape conversion process to proceed or otherwise not prevent the shape conversion process from occurring. When the check 124 determines that shape conversion of the UE-provided location data is unnecessary, the carrier infrastructure 120, the shape conversion module 122, or both can format or structure the UE 110 provided location data into a format or structure that is required or desired by the emergency services 130, if necessary.

The emergency services 130 can include one or more emergency services, such as fire, police and medical, that can respond to or handle communications from the UE 110, such as a request for an emergency service 130. The UE 110 interaction(s) with the emergency services 130 can be through a Public Safety Answering Point (PSAP) 132, or other call or response centers for emergency services. The emergency services 130 may want to know a location of the UE 110 since this is the likely location to which emergency services will be dispatched. To assist with that, the UE 110 can provide location data to the emergency services 130 through the carrier infrastructure 120. The emergency services 130 can require that the provided location data be provided in a particular format or structure, such as a longitude and latitude coordinates with a radius, or axis, of uncertainty, e.g. a circular-shaped area of uncertainty about the coordinates. The location data provided to the emergency services 130 can assist with determining a location to which the emergency services 130 should be dispatched and having reduced uncertainty in the provided location can assist with increasing the efficiency, effectiveness, or both, of the emergency services 130 response. As such, when the UE 110 provided location data includes an area of uncertainty that is already circular-shaped, it is advantageous to bypass the shape conversion process to prevent additional uncertainty from being introduced into the area of uncertainty associated with the location data that will be provided to the emergency services 130.

Figure 2:
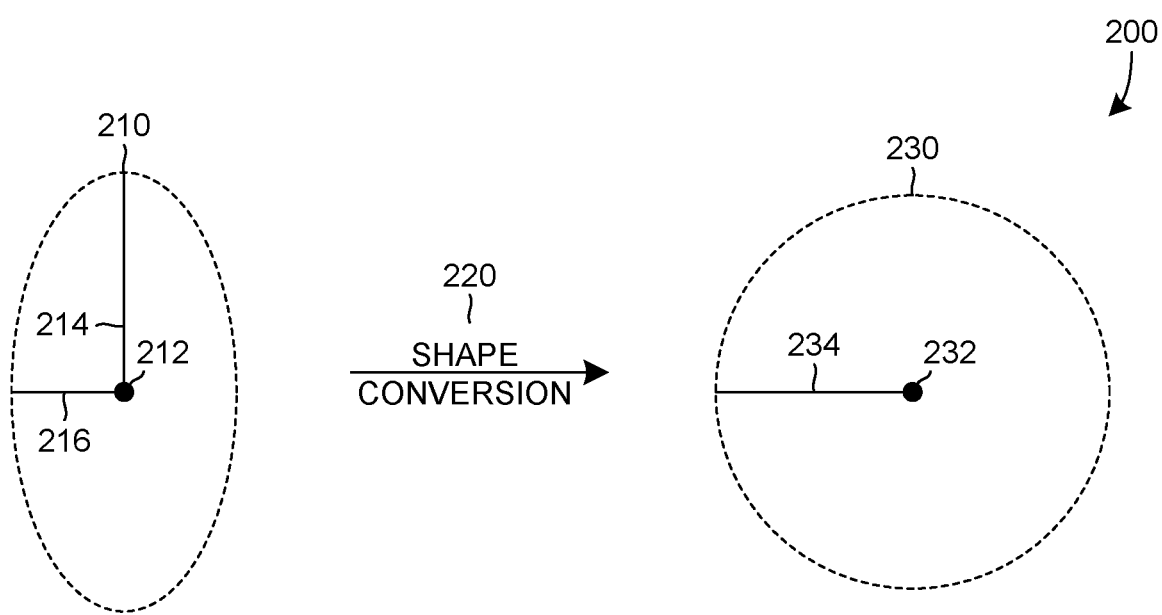
FIG. 2 is an example shape conversion.

FIG. 2 illustrates an example shape conversion 200 of a UE-provided location 210 to a converted location 230 that can be provided to emergency services. The UE-provided location 210, such as a DBH location, includes a central point 212, having a longitude and a latitude, and an elliptically-shaped are of uncertainty. The area of uncertainty is defined by a semimajor axis 214 and a semiminor axis 216 and is indicative of the uncertainty associated with the central point 212. The combination of the central point 212 and the semimajor and semiminor axes 214, 216 define elliptically-shaped area of uncertainty that is provided by the UE, along with the coordinates of the central point 212, as part of the location data. The elliptically-shaped area of uncertainty is not acceptable, or not desirable, by the emergency services, so the provided location data undergoes a shape conversion process 220 that converts the UE-provided location into the converted location 230. The converted location 230 includes a central point 232 that is defined by longitude and latitude coordinates, and a radius 234 that is indicative of the uncertainty regarding the converted location. The central point 232 of the converted location 230 can have the same longitude and latitude coordinates as the central point 212 of the provided location 210. Alternatively, the central points 212, 232 of the provided and converted locations 210, 230 can have different longitude and latitude coordinates. The converted location 230 can be provided to emergency services as an indication of the geographical location of the UE and the uncertainty associated with the provided coordinates of the geographical location of the UE.

Figure 3:
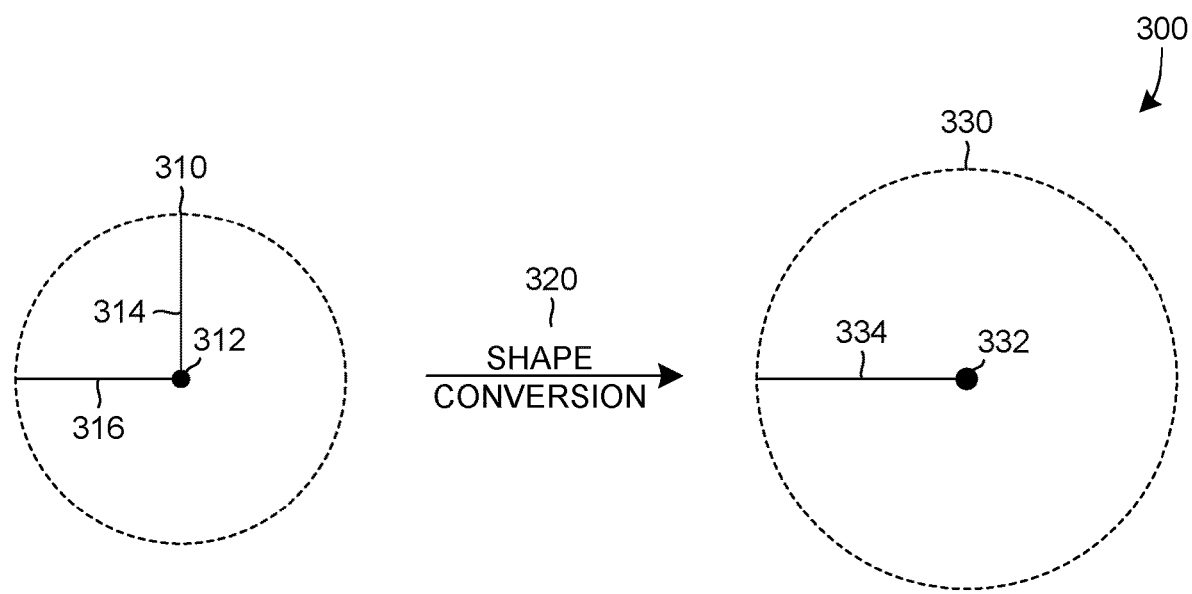
FIG. 3 is another example shape conversion.

FIG. 3 illustrates another example shape conversion 300 of a UE-provided location 310 into a converted location 330 that can be provided to emergency services. The UE-provided location 310, such as a DBH location, includes a central point 312, having a longitude and latitude, and a circular-shaped area of uncertainty. The area of uncertainty associated with the central point 312 is defined by the semimajor and semiminor axes 314, 316 that are indicative of the uncertainty of the provided location. In this example, the semimajor and semiminor axes 314, 316 are equivalent, hence the circular shaped area of uncertainty of the UE-provided location 310. The UE-provided location 310 can undergo shape conversion 320 to generate the converted location 330. The converted location 330 has a central point 332, having longitude and latitude coordinates, and a radius 334 that is indicative of the uncertainty regarding the converted location. In this example, the shape conversion process was performed on a circular-shaped area of uncertainty of the UE-provided location 310 and resulted in a converted location 330 that also has circular-shaped area of uncertainty but has an increased uncertainty in comparison to the UE-provided location 310. That is, the shape conversion process 320 has introduced additional uncertainty into the converted location 330. The increased uncertainty of the converted location 330 can reduce the efficiency, effectiveness, or both, of determining a location of the UE by the emergency services, such as a location to dispatch services to or guiding the services to a location of the UE.

Figure 4:
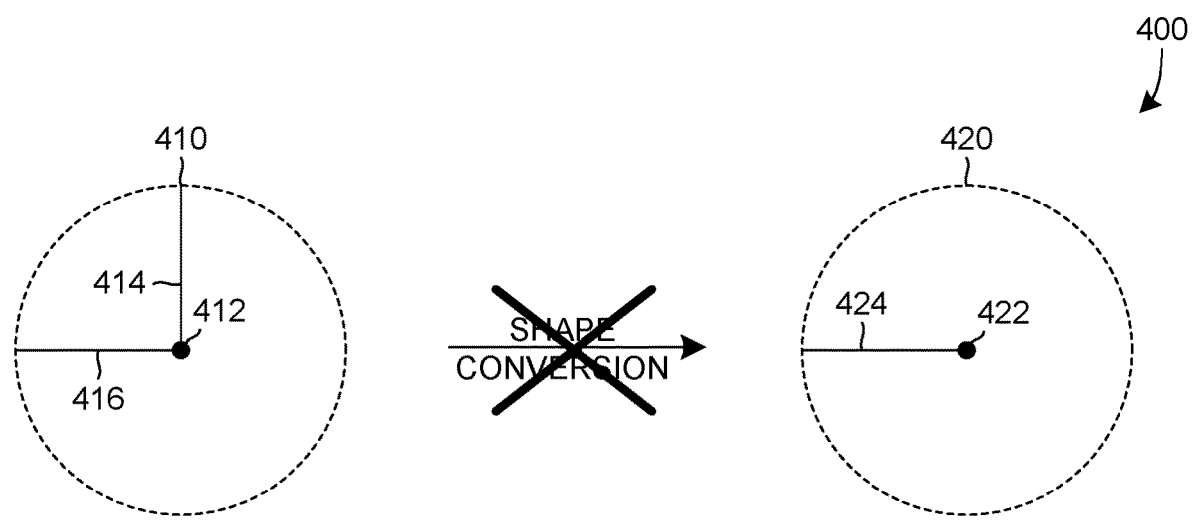
FIG. 4 is an example of providing a location.

FIG. 4 is an example of providing a location 400 that includes the semimajor and semiminor axes check functionality, or logic, that prevent a shape conversion process from being performed on a provided location 410. The UE-provided location 410 includes central point 412 that has longitude and latitude coordinates and equal semimajor and semiminor axes 414, 416 that define the area of uncertainty about the central point 412, like the provided location 310 of FIG. 3. However, the shape conversion process is prevented from happening since the semimajor and semiminor axes 414, 416 are equal and the shape conversion process can introduce additional uncertainty in location data or location that is provided to an emergency service. The UE-provided location 410 has uncertainty associated therewith that can be caused by inherent inaccuracies of the location sensors, processes or systems that the UE is using to determine its location. Performing the shape conversion process on a UE-provided location that includes a circular-shaped area of uncertainty, such as 410, can cause additional uncertainty to be introduced, such as by the algorithm, as the process attempts to convert the UE-provided circular-shaped area of uncertainty into a circular-shaped area of uncertainty that can be provided to emergency services. To prevent the introduction of additional uncertainty, the shape conversion process can be prevented from being performed on UE-provided location data that includes a circular-shaped area of uncertainty. Instead of performing the shape conversion process, the UE-provided location 410 can be formatted into a provided location 420 that includes a central point 422 that has longitude and latitude coordinates, and a radius 424 that indicates the uncertainty associated with the provided location 420.

In an example, the central point 422 of the provided location 420 can have the same coordinates as the central point 412 of the UE-provided location 410 and the radius 424 can be either (or both) of the equal semimajor or semiminor axes 414, 416 of the UE-provided location 410. By preventing the shape conversion from being performed on the circular-shaped area of uncertainty of the UE-provided location 410, no additional error is introduced into the provided location 420, unlike the example of FIG. 3. The more accurate or correct provided location 420 can assist with maintaining or increasing the efficiency or effectiveness of the emergency services response in comparison to the provided location that undergoes the shape conversion process to generate the converted location.

Figure 5:
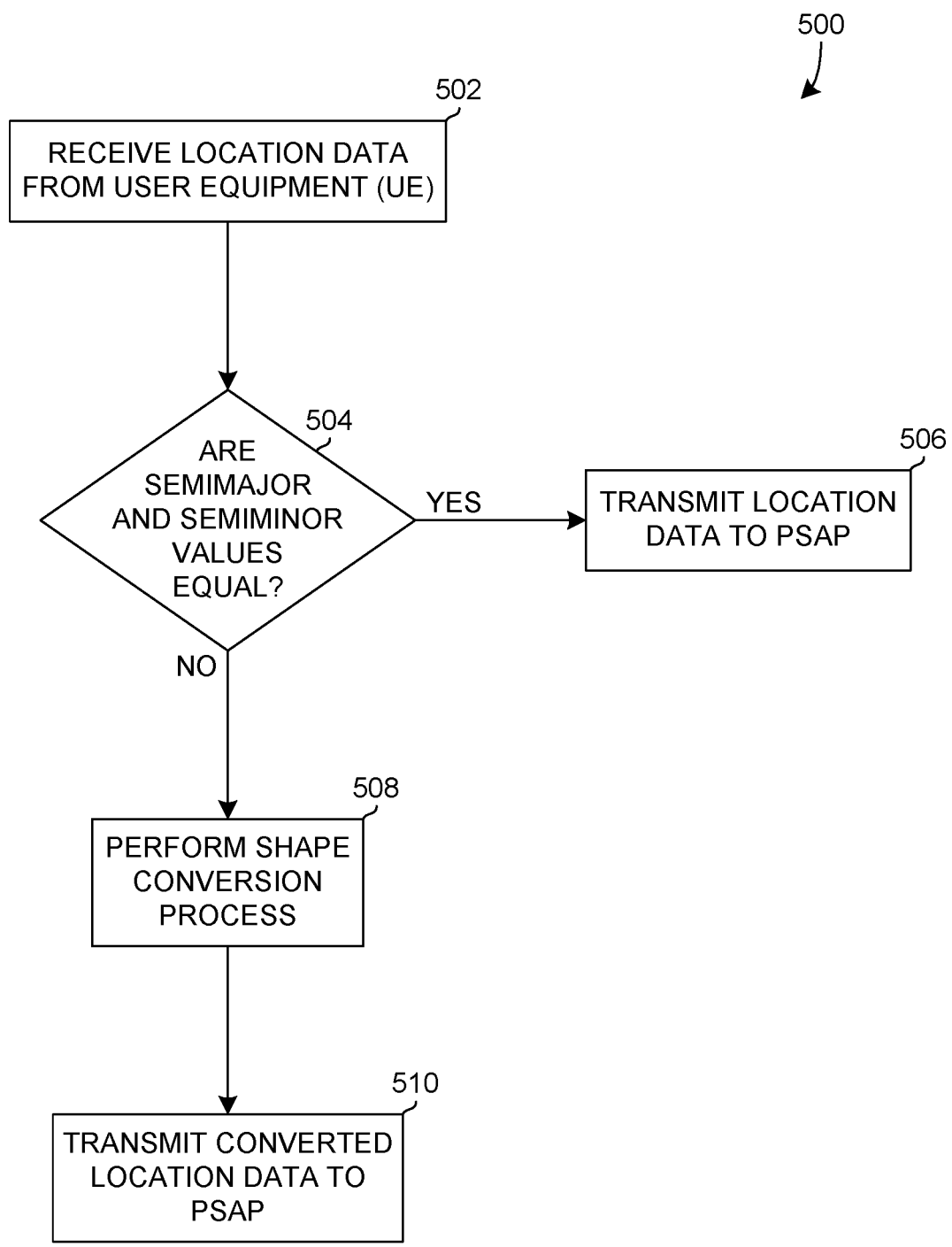
FIG. 5 is an example method of providing a location of a UE.

FIG. 5 is an example process 500 of providing a location to an emergency service, such as a PSAP. The example process 500 can be performed by the processor 140 configured to receive the location data and execute the location data instructions. The processor 140 can access the location data instructions from the memory 128. At 502, location data, such as a DBH location, is received from the UE. The received location data can include a set of longitude and latitude coordinates, along with semimajor and semiminor axes that are indicative of the uncertainty associated with the location data. The received location data of the UE can define an elliptically-shaped or a circular-shaped area of uncertainty associated with the provided coordinates at which the UE is likely located.

At 504, the semimajor and semiminor axes are compared to determine if the values, or magnitudes, of the axes are equal. If the received location data defines an elliptically-shaped area of uncertainty, then the semimajor and semiminor axes of the received location data will be unequal, or different, in value or magnitude. If the received location data defines a circular-shaped area of uncertainty, then the semimajor and semiminor axes of the received location data will be equal or the same in value or magnitude. When the determination is made that the semimajor and semiminor axes are equal, the process proceeds to 506, and if the semimajor and semiminor axes are unequal, the process proceeds to 508.

At 506, the semimajor and semiminor axes are equal so the received location data already includes the circular-shaped area of uncertainty required, or desired, by the PSAP or other emergency services or responders. The received location data can be transmitted, or provided, to the PSAP as the location of the UE. Prior to transmitting the location data, the received location data can be processed, or structured, into a format that is acceptable to emergency services, such as a PSAP-acceptable format, if needed. The emergency services acceptable format can allow the emergency services to process the provided location data using their systems. The emergency services acceptable format creates a universal standard for incoming data related to emergencies from all sources of emergency requests. For example, the emergency services can parse the data in the emergency services acceptable format into its components for further processing, such as processing to optimize response time for first responders to emergencies.

At 508, the received location data can undergo the shape conversion process to convert the ellipsis-shaped area of uncertainty into a circular-shaped area of uncertainty associated with the coordinates of the location data provided by the UE. The shape conversion process can use an algorithm to convert the longitude and latitude coordinates and the semimajor and semiminor axes of the received location data into the converted location data that includes a circular-shaped area of uncertainty, or longitude and latitude coordinates with a radius, that can be provided or transmitted to a PSAP, or other emergency services related entity. In an example, a cellular service provider, or carrier, can use their network infrastructure to perform this shape conversion process and to provide the converted location data to the PSAP, or emergency services.

At 510, the converted location data is transmitted, or otherwise provided, to the PSAP. The converted location data includes a set of coordinates and a circular-shaped area of uncertainty at which the initial location data providing UE, such as a mobile device, is located. Prior to transmitting the converted location data to the PSAP, the converted location data can be formatted or structured, if necessary, based on the requirements of the PSAP. The converted data can include longitude and latitude coordinates and a radius indicative of the error regarding the exact location of the UE that provided the initial location data.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A method of providing a location of a user equipment (UE), comprising: receiving location data from the UE, the location data including at least a semimajor axis and a semiminor axis; comparing a feature of the semimajor axis and the semiminor axis; if the compared feature has a pre-determined value having equal magnitude, bypassing a shape conversion process; and after the shape conversion process is bypassed, outputting the location data.

2. The method of claim 1, further comprising formatting the location data into a format that is acceptable to emergency services, and after the shape conversion process is bypassed, outputting the formatted location data.

3. The method of claim 1, wherein the location data includes a set of coordinates that indicates a geographic area of the UE.

4. The method of claim 1, further comprising, after the shape conversion process is bypassed, immediately outputting the location data.

5. The method of claim 1, further comprising outputting the location data to an emergency service.

6. The method of claim 5, wherein the emergency service is a public safety answering point (PSAP).

7. A location providing system, comprising: a processor configured to: receive location data, and execute location data instructions, the instructions comprising, comparing a feature of a semimajor axis and a semiminor axis, and if a compared feature has a predetermined value having equal magnitude, foregoing converting the location data into the converted location data, and convert location data received by a user equipment (UE) into converted location data; and a memory storing the location data instructions, the memory being accessible by the processor.

8. The system of claim 7, wherein the location data of the UE is generated by one or more sensors of the UE.

9. The system of claim 8, wherein the location data is a device hybrid location.

10. The system of claim 7, wherein the location data includes a set of coordinates that indicates a geographic area of the UE.

11. The system of claim 7, further comprising an output to transmit the location data to an emergency service.

12. The system of claim 11, wherein the emergency service is a public safety answering point (P SAP).

13. The system of claim 7, further comprising
an output programmed to transmit the formatted location data to the emergency service, and the processor being further configured format the location data into a formatted location data for an emergency service.

14. The system of claim 13, wherein a carrier infrastructure comprises the processor and the output.

15. The system of claim 7, wherein the converted location data comprises a radius, and wherein the location data comprises a semimajor axis and a semiminor axis.

16. The system of claim 7, wherein the feature of the semimajor axis and the semiminor axis is a same feature.

\* \* \* \* \*